April 7, 1959
T. H. OSTER
2,881,330
DIFFERENTIAL DRIVE
Filed Aug. 1, 1956
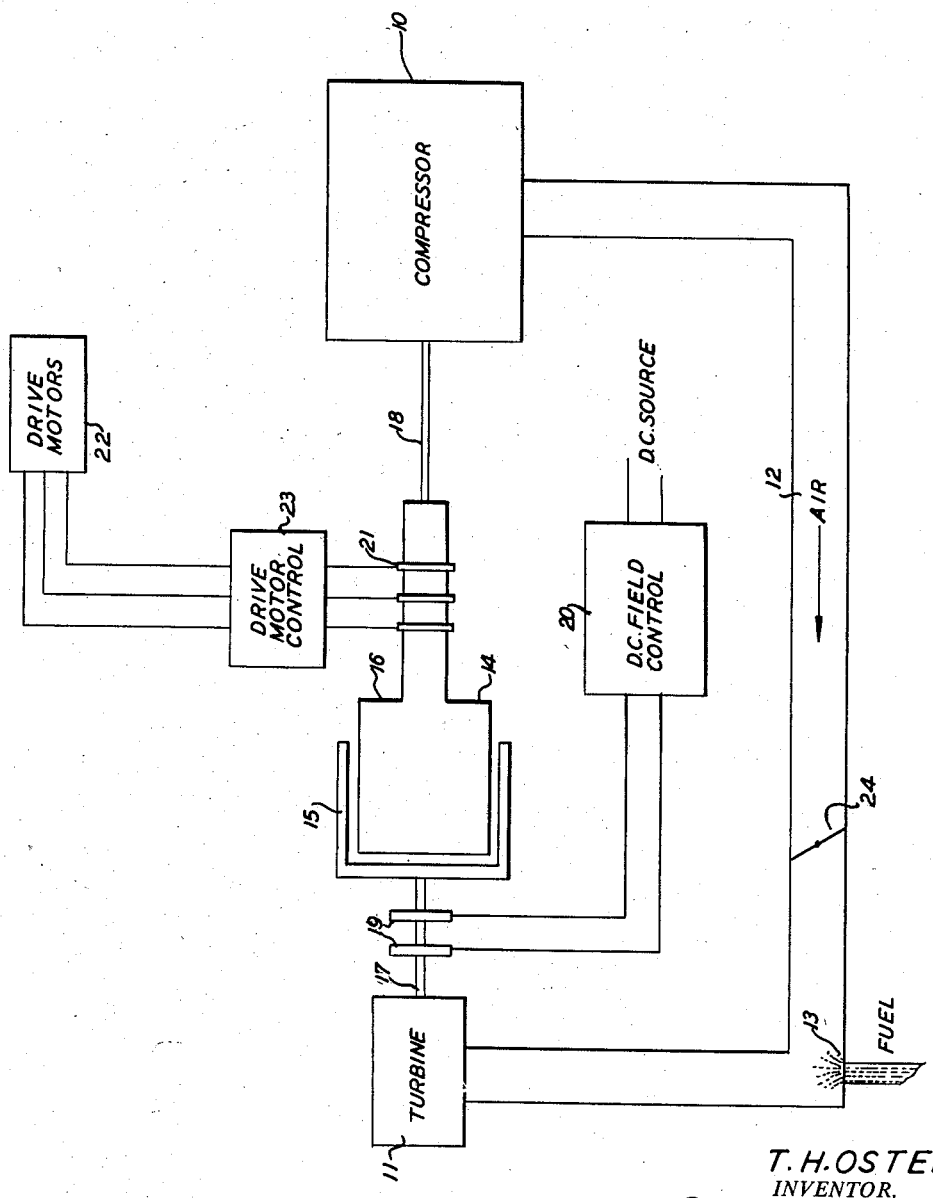
T. H. OSTER
INVENTOR.
BY E. C. McRae
J. R. Faulkner
ATTORNEYS

United States Patent Office 2,881,330
Patented Apr. 7, 1959

2,881,330

DIFFERENTIAL DRIVE

Thomas H. Oster, Dearborn, Mich., assignor to Ford Motor Company, Dearborn, Mich., a corporation of Delaware Application August 1, 1956, Serial No. 601,409

7 Claims. (Cl. 290—15)

This invention relates to a gas turbine apparatus for electrically driving a variable speed load and more particularly to one such apparatus having an improved overall efficiency due to operation of the compressor at a uniform optimum speed.

Gas turbines are conventionally fed a stream of hot compressed gas originating in a centrifugal compressor. It is inherent in the nature of centrifugal compressors that they operate at an optimum efficiency in any given set of circumstances at only one speed or over a narrow speed range. In many gas turbine installations the losses in the compressor are many times the losses elsewhere in the system and are comparable with the useful output of the machine.

This invention has been perfected in an effort to minimize compressor losses and is readily understood by reference to the drawing.

In the drawing, compressor 10 is connected to turbine 11 by conduit 12. As is conventionally done, compressed air from compressor 10 feeds turbine 11 and is heated intermediate compressor 10 and turbine 11 as by the combustion of fuel through nozzle 13. Turbine 11 drives compressor 10 through a dynamo-electric machine 14 which comprises a rotatable field 15 and separately rotatable armature 16. There is a direct mechanical connection between turbine 11 and rotatable field 15 and a direct mechanical connection between compressor 10 and separately rotatable armature 16 through shaft 17 and shaft 18 respectively. However, there is no mechanical connection between turbine 11 and compressor 10, the drive being solely electromagnetic. Dynamo-electric machine 14 many take the form of either a direct current machine or an alternator although the alternator is usually to be preferred. In either case rotatable field 15 is energized through slip rings 19 and is controlled by field control 20. Separately rotatable armature 16 imparts electrical energy to slip rings 21 which transmit electrical energy to variable speed drive motors 22 through drive motor control 23.

To start up this apparatus the rotatable field 15 is fully energized from an external source and the output circuit from the armature is short circuited by motor control 23 and consequently a rigid or almost rigid driving connection between compressor 10 and turbine 11 is establ'shed. Turbine 11 and compressor 10 are rotated by any conventional starting mechanism and as soon as compressor 10 builds up an appreciable pressure fuel is injected through nozzle 13 and ignited. This causes the acceleration of turbine 11 and consequently of compressor 10. The top speed of the assemblage may be controlled by a throttle valve 24 inserted in conduit 12.

When the compressor has reached the optimum or desired speed the direct current field control 20 weakens the magnetic rotatable field 15 and permits turbine 11 to overrun compressor 10. This differential speed so established between the speed of turbine 11 and compressor 10 causes an electrical potential to be generated in rotatable armature 16 which may then be transmitted to variable speed drive motors 22 through drive motor control 23 and slip rings 21.

It is to be understood that either the field or armature of dynamo-electric machine 14 may be connected to the turbine as long as the complementary member is connected to the compressor.

I claim as my invention:

1. A gas turbine apparatus comprising a compressor, a turbine, a gas conduit connecting said compressor and turbine, a dynamo-electric machine non-mechanically coupling said compressor and turbine comprising a rotatable field means and a separately rotatable armature means, one of said means being coupled to said turbine and the other means being coupled to said compressor, and means for electrically connecting said rotatable armature means to an external load.

2. A gas turbine apparatus comprising a compressor, a turbine, a gas conduit connecting said compressor and turbine, a fuel injecting means in said conduit intermediate said compressor and turbine, a dynamo-electric machine non-mechanically coupling said compressor and turbine comprising a rotatable field means and a separately rotatable armature means, one of which means being coupled to said turbine and the other means being coupled to said compressor, and means for electrically connecting said rotatable armature means to an external load.

3. A gas turbine apparatus comprising a constant speed compressor, a variable speed turbine, a gas conduit connecting said constant speed compressor to said variable speed turbine, means for imparting heat to an air stream within said gas conduit, a dynamo-electric machine comprising a rotatable field means and a separately rotatable armature, one of said means being driven by the variable speed turbine and the other means driving the constant speed compressor, control means controlling the energization of said rotatable field means to electromagnetically couple said turbine to said compressor, and means for electrically connecting said rotatable armature means to an external load.

4. A gas turbine apparatus comprising a constant speed compressor, a variable speed turbine, a gas conduit connecting said conduit speed compressor to said variable speed turbine, a variable speed driving motor, means for imparting heat to a gas stream within said gas conduit, a dynamo-electric machine comprising a rotatable field means and a separately rotatable armature means, one of said means being driven by the variable speed turbine and the other means driving the constant speed compressor, control means controlling the energization of said rotatable field means to electromagnetically couple said turbine to said compressor, and means for electrically connecting said rotatable armature means to said variable speed driving motor.

5. A gas turbine apparatus comprising a compressor, a turbine, a gas conduit connecting said compressor and turbine, a throttling means interposed in said conduit between the compressor and turbine, a dynamo-electric machine non-mechanically coupling said compressor and turbine comprising a rotatable field means and a separately rotatable armature means, one of said means being coupled to said turbine and the other means being coupled to said compressor, and means for electrically connecting said rotatable armature means to an external load.

6. A gas turbine apparatus comprising a constant speed compressor, a variable speed turbine, a gas conduit connecting said constant speed compressor to said variable speed turbine, means for imparting heat to an air stream within said gas conduit, a dynamo-electric machine comprising a rotatable field means and a separately rotatable armature, one of said means being driven by the variable speed turbine and the other means driving the constant speed compressor, control means controlling the energization of said rotatable field means to electromagnetically couple said turbine to said compressor, and means for electrically connecting said rotatable armature means to an external load, said control means controlling the application of current to said dynamo-electric machine from a source of direct current.

7. A gas turbine apparatus comprising a constant speed compressor, a variable speed turbine, a gas conduit connecting said constant speed compressor to said variable speed turbine, a throttling means interposed in said conduit between the compressor and said turbine, means for imparting heat to an air stream within said gas conduit, a dynamo-electric machine comprising a rotatable field means and a separately rotatable armature, one of said means being driven by the variable speed turbine and the other means driving the constant speed compressor, control means controlling the energization of said rotatable field means to electromagnetically couple said turbine to said compressor, and means for electrically connecting said rotatable armature means to an external load, said control means controlling the application of current to said dynamo-electric machine from a source of direct current.

References Cited in the file of this patent

UNITED STATES PATENTS

| | | |
|---|---|---|
| 871,098 | Albrecht | Nov. 19, 1907 |
| 1,361,244 | Fynn | Dec. 7, 1920 |
| 2,371,889 | Hermitte | Mar. 20, 1945 |